(12) United States Patent
McLaughlin et al.

(10) Patent No.: US 6,315,688 B1
(45) Date of Patent: Nov. 13, 2001

(54) DERAILLEUR LINK

(75) Inventors: Scott A. McLaughlin, Chicago, IL (US); Robert K. Boehm, Germersheim (DE); Kent A. Solberg, Chicago, IL (US); Andreas A. Benz, Schonungen (DE); Kevin F. Wesling, Lombard, IL (US); Jacques P. Greetis, St. Charles; Tyler D. Duston, Evanston, both of IL (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 09/151,257

(22) Filed: Sep. 10, 1998

(51) Int. Cl.[7] ............... F16H 9/00; F16H 59/00
(52) U.S. Cl. ................. 474/82; 474/80
(58) Field of Search ............ 474/69, 80, 82, 474/77–79; 74/502.2

(56) References Cited

U.S. PATENT DOCUMENTS

| | | | |
|---|---|---|---|
| 4,027,542 | * 6/1977 | Nagano | 474/82 |
| 4,269,601 | * 5/1981 | Nagano | 474/82 |
| 5,302,155 | * 4/1994 | Ishibashi | 474/82 |
| 5,533,937 | 7/1996 | Patterson et al. | 474/80 |
| 5,620,383 | * 4/1997 | Patterson et al. | 474/80 |
| 5,624,335 | * 4/1997 | Ando | 474/80 |
| 5,860,880 | * 1/1999 | Oka | 474/77 |

* cited by examiner

Primary Examiner—David A. Bucci
Assistant Examiner—Marcus Charles
(74) Attorney, Agent, or Firm—Jefferson Perkins; Milan Milosevic; Piper Marbury Rudnick & Wolfe

(57) ABSTRACT

A bicycle derailleur is provided with a parallelogram link that is sufficiently rigid axially to maintain the distance between the link pivot axes during derailleur actuation but substantially flexible in torsion and shear to permit simple alignment of the pivot holes and control of the link width during formation and assembly of the link, thereby ensuring smooth operation of the derailleur during gear shifts.

15 Claims, 12 Drawing Sheets

DERAILLEUR LINK

TECHNICAL FIELD OF THE INVENTION

This invention relates in general to bicycle derailleurs, and more particularly to a bicycle derailleur including a parallelogram linkage having a link member exhibiting increased flexibility under shear and torsional loading.

BACKGROUND OF THE INVENTION

Bicycle derailleurs are used to effect gear shifts by changing the position of a drive chain between the variable diameter sprockets of a multi-sprocket freewheel or crankset. The position of a chain on a sprocket of a freewheel and on a chainring of a crankset determines the gear ratio of the bicycle at which the rider must pedal. Typically, as shown in FIG. 1, a rear derailleur 10 includes a parallelogram linkage 20 that is attached to a bicycle frame element 30 at one end, and to an idler cage 32 at another end, the idler cage laterally urging the chain between the multiple sprockets or chainrings (not shown). A control cable 34 is tied at one end to a shifter mounted proximate the rider's hand on the handlebar or on the downtube of a bicycle frame (not shown), and at the second end to the parallelogram. The parallelogram is typically spring biased in a given direction, requiring the rider to actuate the shifter and tension the control cable in order to deflect the parallelogram and in turn urge the chain in a direction opposite to the spring-biased direction.

A parallelogram linkage 20 typically includes inner and outer links or side plates 40, 42, respectively, pivotally connected at axes D and C, respectively, to a b-knuckle 44 (which in turn is attached to the bicycle frame 30) and pivotally connected at axes B and A, respectively, to a p-knuckle 46 (to which the idler cage 32 is attached), the parallelogram displaceable to precisely position the idler cage 32 and in turn the drive chain onto the desired sprocket. A return spring 48 biasing the parallelogram is typically a helical or coil spring urging together diagonally opposed pivot points of the parallelogram.

As shown in FIG. 2, links are typically formed into longitudinal channel members from a flat plate with pivot holes 50–53 located at both ends of resulting flange elements 54 for pivotal attachment to b-knuckles 44 and p-knuckle 46 with a pair of pins (not shown). In such link designs, it is difficult to control the angle of bend of the flange elements 54 with respect to a base element 55 and in turn the overall width W of the link member 40 (FIG. 2a). Accordingly, this may result in binding between the link 40 and knuckle elements 44, 46, inhibiting the smooth operation of the parallelogram and potentially even jamming the derailleur. Additionally, as shown in FIGS. 2b (top view) and 2c (end view), the four pivot holes 50–53 punched into the flanges 54 must be precisely located to ensure proper alignment of the holes both along the length and height of the flanges to ensure "parallelism" of the pivot holes. Again, failure to hold close tolerances in locating the holes will make assembly of links 40, 42 onto the knuckles 44, 46 difficult and inhibit the smooth displacement of the parallelogram 20.

A further consideration in link designs is described in this assignee's pending application Ser. No. 09/005,214, entitled "Hybrid Spring For Bicycle Derailleurs." In one embodiment of the invention of said application, a hybrid derailleur return spring force is achieved by urging an abutment member attached to one of the links forming the parallelogram against the coil spring during actuation of the parallelogram thereby imparting a transverse force to the coil spring and laterally deflecting the coil spring to produce the desired spring force. In such designs, the extent of lateral displacement of the spring is restricted by contact with the base element 55 of conventional link configurations thereby limiting the spring forces that can be achieved.

A need therefore exists for a derailleur parallelogram link that is sufficiently rigid axially to maintain the distance between the pivot axes during derailleur actuation but is also sufficiently flexible in torsion and shear to permit simple alignment of the pivot holes and easy control of the link width. A need also exists for parallelogram links that permit extended lateral displacement of coil return springs for parallelograms configured with abutment members that laterally deflect the return spring.

SUMMARY OF THE INVENTION

It is an object of the present invention to provide a bicycle derailleur having a parallelogram link that is simple to form and assemble, eliminating the need to precisely control link width and pivot hole location during formation of the link. It is another object of this invention to provide a parallelogram link that is substantially rigid axially to maintain the distance between the pivot axes during derailleur actuation and substantially flexible in torsion and shear to permit simple alignment of the pivot holes and easy control of the link width.

It is a further object of the preset invention to provide a parallelogram link that permits extended lateral displacement of the coil return spring in parallelograms configured with abutment members that laterally deflect the return spring.

It is a yet another object of the invention to provide a parallelogram link that is lighter than conventional link configurations.

The bicycle derailleur of the present invention includes an elongated parallelogram link rotatable at first and second ends about substantially parallel first and second pivot axes, respectively, the link being substantially rigid axially along a third axis substantially perpendicular to the first and second axes but also substantially flexible torsionally about the third axis as well as substantially flexible in shear in a plane defined by the first and second pivot axes.

Further objects and advantages of the invention will become apparent from consideration of the drawings and ensuing description.

BRIEF DESCRIPTION OF THE DRAWINGS

Further aspects of the invention and their advantages will be discerned with reference to the appended drawings, in which like characters identify like parts and in which:

FIG. 2a is a sectional view of the link of FIG. 2 along line 2a;

DETAILED DESCRIPTION OF ILLUSTRATED EMBODIMENT

Figure 1:
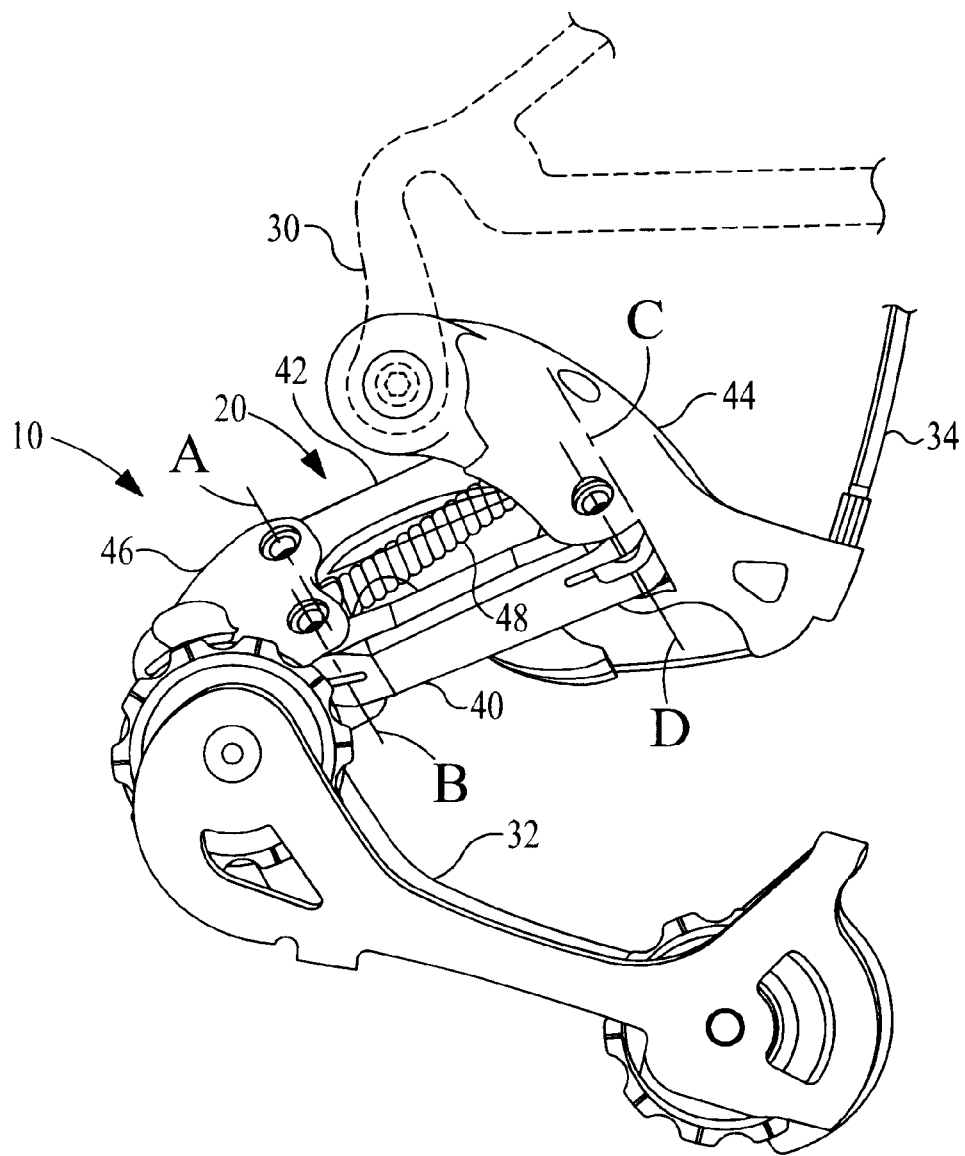
FIG. 1 is a perspective view of a conventional derailleur assembly looking outboard from the bicycle frame.

The bicycle derailleur of the present invention substantially eliminates or reduces the described disadvantages of prior art derailleur mechanisms. According to one aspect of the invention, a parallelogram including a b-knuckle, a p-knuckle and hingedly affixed links or side plates is provided for positioning a drive chain on sprockets of a multi-sprocket freewheel in response to displacement of a control cable. Typically, a derailleur parallelogram includes inner and outer links for precise positioning of an idler cage during derailleur actuation.

Issued U.S. Pat. No. 5,533,937 and 5,620,383, commonly owned by the assignee of the present invention, fully describe the operation of derailleur-type shifting systems and are fully incorporated herein by reference.

Referring first to FIGS. 3–6, a preferred bicycle derailleur parallelogram mechanism indicated generally at 70 includes a base member 82 (termed the "b-knuckle") attached at one end 83 to a bicycle frame element (not shown), an end member 84 (termed the "p-knuckle") connected at one end 85 to a idler cage (not shown), an inner link or side plate 86 pivotally attached to b-knuckle 82 at pivot D and to p-knuckle 84 at pivot B, and an outer link or side plate 88 pivotally attached to b-knuckle 82 at pivot C and to p-knuckle 84 at pivot A. In the described embodiment, a coil spring 90, connected about and drawing together pivots B and C, biases parallelogram 70 in an outboard direction away from the bicycle frame, requiring the input of a cable force (cable attachable at point 87) to deflect or rotate parallelogram 70 to its inboard-most position.

Figure 7:
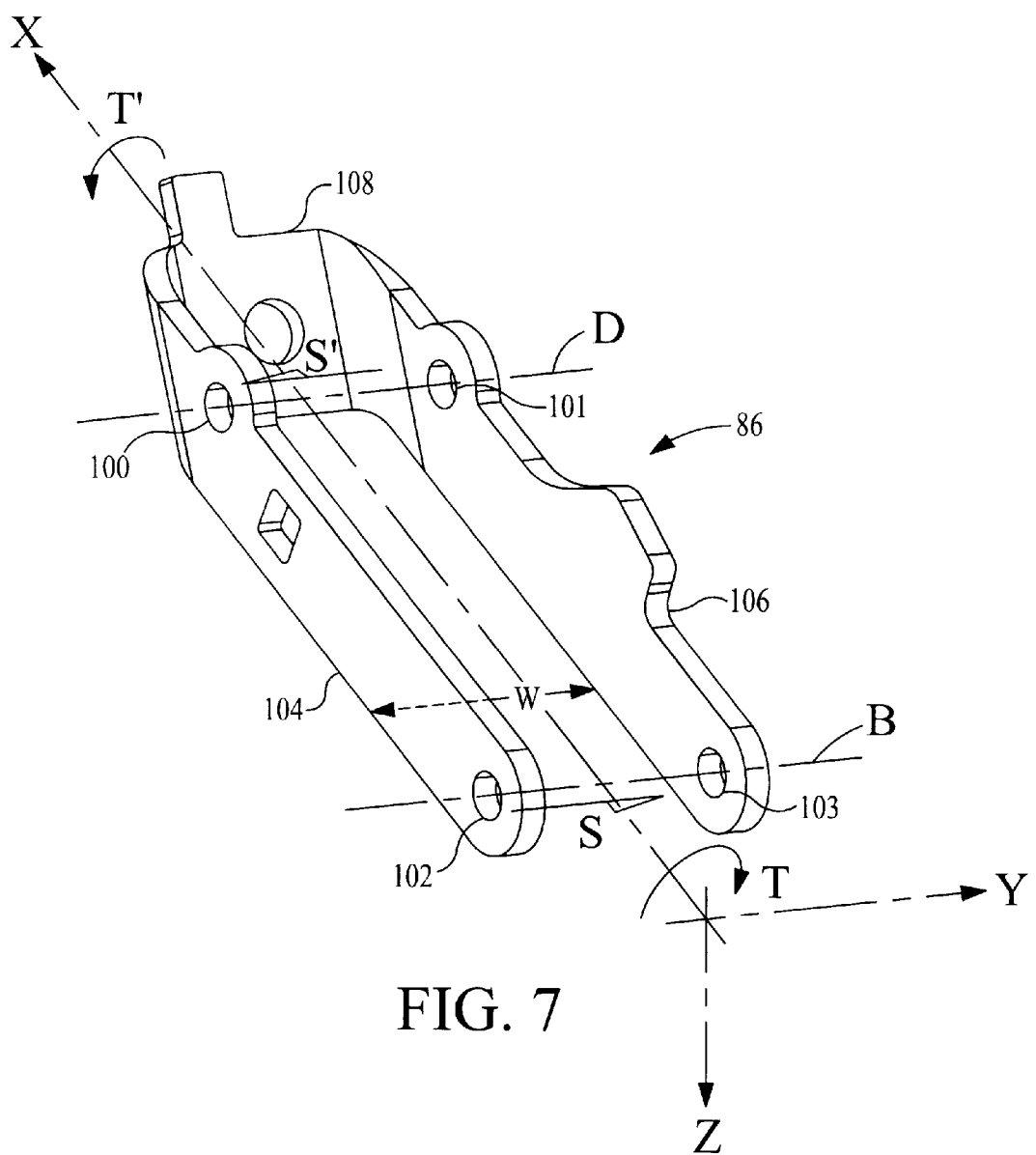
FIG. 7 is a perspective view of a preferred embodiment of the parallelogram link of the present invention.

FIG. 7 illustrates a preferred embodiment of side plate 86 hingedly attachable to b-knuckle 82 at pivot D through holes 100, 101, and hingedly attachable to p-knuckle 84 at pivot B through holes 102, 103 with a pair of pins (not shown). Side plate 86 is cut from a flat sheet, first punching pivot holes 100–103, and then bending the side plate into a U-shape with elongated leg elements 104, 106 substantially paralleling a longitudinal axis X substantially perpendicular to and coplanar with pivots B and D, and base element 108. The widths of each of the leg elements 104, 106 in a Z direction (up in FIG. 7) is larger than a depth thereof in a Y direction (horizontal in FIG. 7) but less than a length of the leg elements in an X direction. The X dimension of the XZ cross-sectional area of the connecting element 108 is small relative to the width of the leg elements 104 and 106. So configured, side plate 86 provides sufficient axial stiffness along the X axis to maintain a constant distance between pivots B and D (i.e. holes 100, 102 and holes 101, 103) during actuation of the derailleur. Additionally, side plate 86 provides sufficient torsional flexibility about axis X (as depicted by equal and opposite torsional forces T, T') and shear flexibility in the plane defined by pivots B and D (as depicted by equal and opposite shearing forces S, S', or XY plane) to permit simple alignment of paired holes 100, 101 and 102, 103 (i.e. ensure parallelism of holes) and easy control of the width W of the side plate.

In conventional parallelograms, both the inner and outer side plates are typically fairly rigid axially, torsionally, as well as in shear. According to a preferred parallelogram linkage of the present invention, one of the links can be of a conventional design (i.e. rigid axially, torsionally and in shear), while the second link can be configured according to the present invention: only one is required to be rigid axially, sufficiently so to maintain the distance between the pivots during derailleur actuation. Although only the inner link is described herein, the preferred side plate configuration of the present invention can be applied to the inner or outer links.

In parallelograms configured with abutment members that laterally deflect the coil spring 90 to achieve a hybrid spring force, the U-shaped design of side plate 86 permits spring 90 to be laterally deflected between flange elements 104, 106 without limiting the extent of spring lateral displacement.

Figure 8:
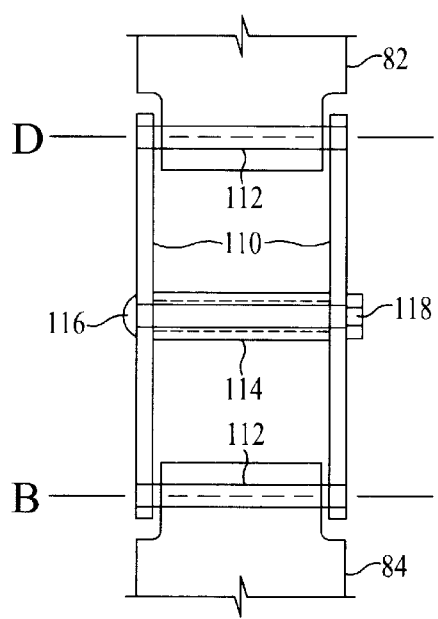
FIGS. 8–17 are elevational views of alternative embodiments of the parallelogram link of the present invention.
Figure 9:
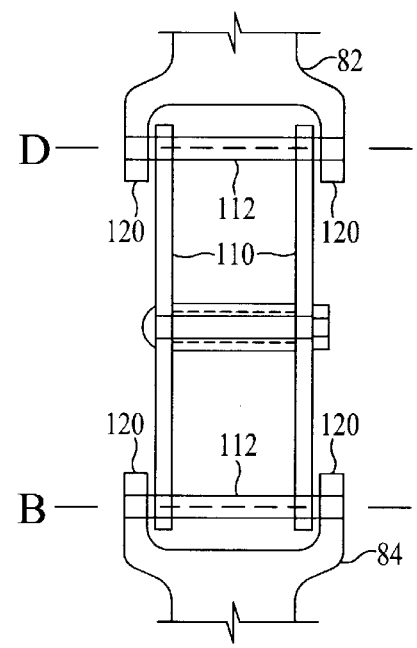

FIG. 8 is an additional embodiment of the invention including a pair of flat, elongated plates 110 rotatably mounted onto pins 112 pressed into the pivot holes located in the b-knuckle 82 and p-knuckle 84 (or held with set screws), the plates 110 clamped onto and spaced by a connecting element, here bushing 114 with a nut 118 and bolt 116. Bushing 114 is located about equidistantly from the ends of the elongated plates 110 and is small in cross-sectional area. The amount of resistance provided by bushing 114 to torsion and shear is relatively small in comparison to the coaxial rigidity provided by the plates 110. FIG. 9 is a similar embodiment of the invention wherein plates 110 are pivotally attached to pins 112 inside attachment arms 120 of the b-knuckle 82 and p-knuckle 84.

Figure 10:
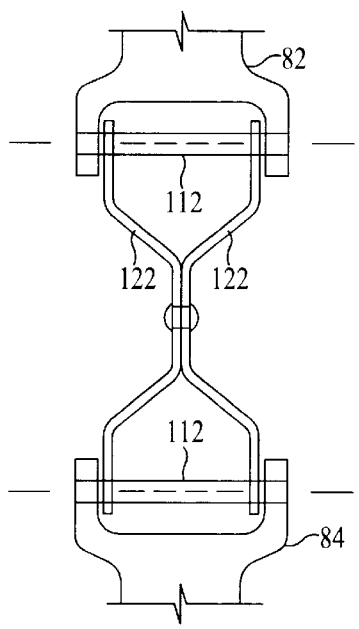

FIG. 10 is an additional embodiment of the invention wherein a pair of bent-up sheet metal strips 122 adjoin each other equidistant their respective longitudinal ends, and are bolted or welded together to form an H-shaped side plate that, as in the embodiment of FIG. 9, is rotatably mounted onto pins 112. The sheet metal strip 122 are substantially axially rigid but will exhibit some give when subjected to torsion or shear forces.

Figure 11:
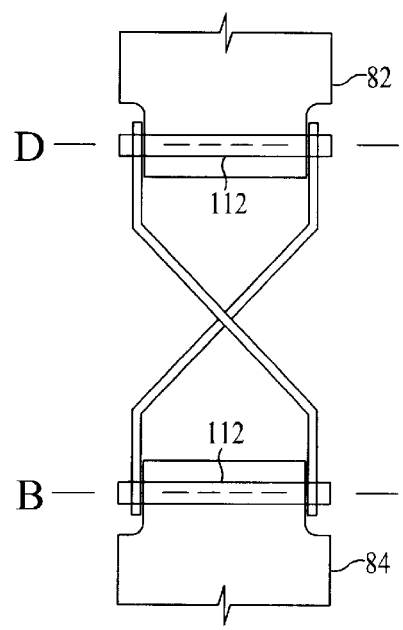
Figure 11A:
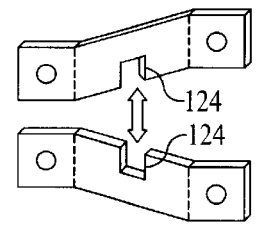

FIG. 11 is an additional embodiment of the invention wherein a pair of plates interlock at U-shaped slots 124 formed at their midpoints, as shown in FIG. 11a, to form an X-shaped side plate that is, likewise, rotatably mounted onto pins 112.

Figure 12:
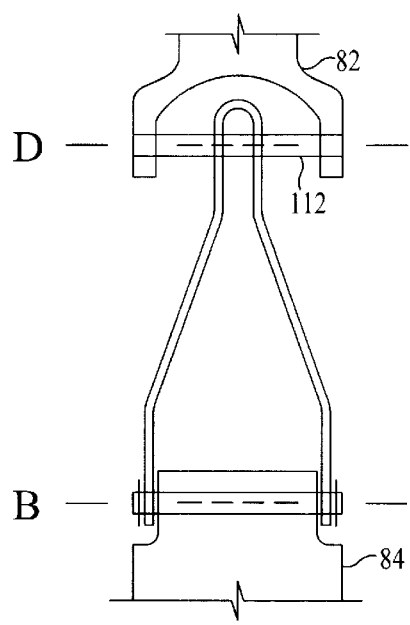
Figure 13:
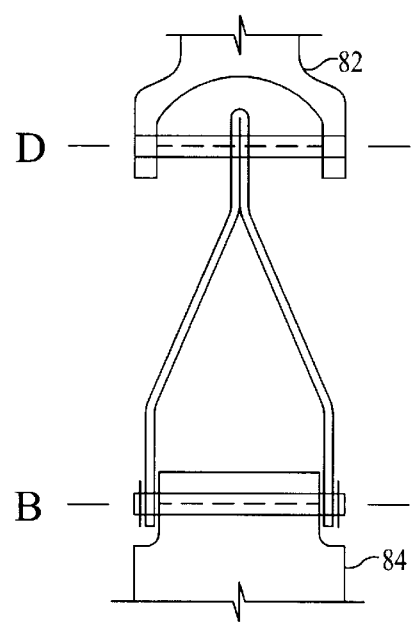

FIGS. 12 and 13 are additional embodiments of the invention wherein the side plate is formed from a single metal strip into a wishbone-shape and pivotally attached to pins 112. In these embodiments, the connection of the two legs of the side plates is effectively made by the end of one being continuous with the end of the other.

Figure 2A:
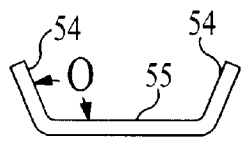
Figure 2B:
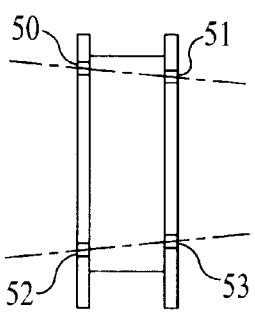
FIG. 2b is a top view of the link of FIG. 2.
Figure 2C:
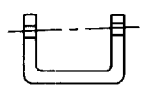
FIG. 2c is an end view of the link of FIG. 2.
Figure 2:
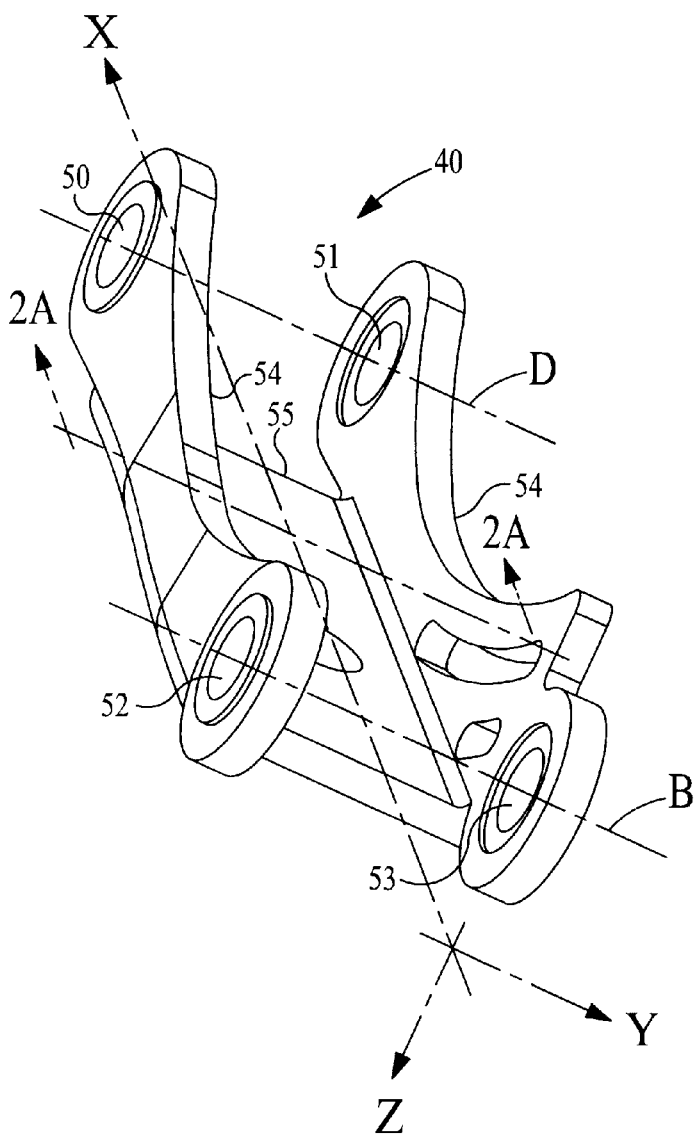
FIG. 2 is a perspective view of a conventional parallelogram link or side plate.
Figure 3:
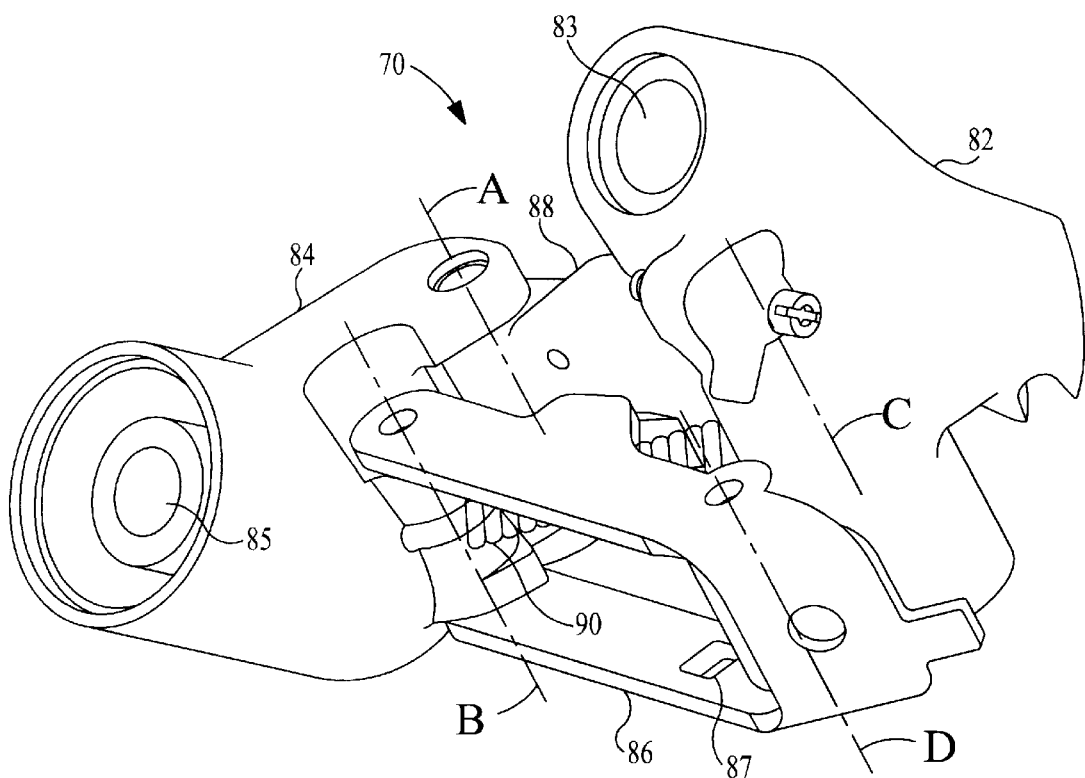
FIG. 3 is a perspective view of a parallelogram link assembly according to the present invention looking primarily outboard from the bicycle frame.
Figure 4:
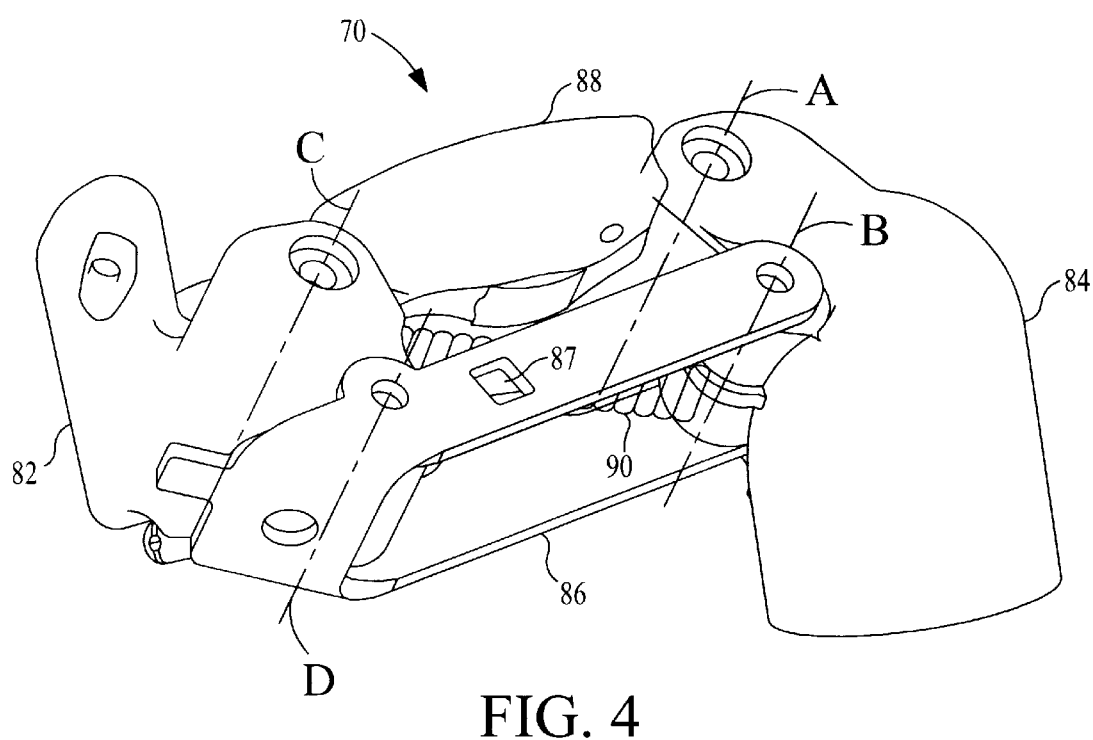
FIG. 4 is a perspective view of the parallelogram link assembly of FIG. 3 looking primarily inboard toward the bicycle frame.
Figure 5:
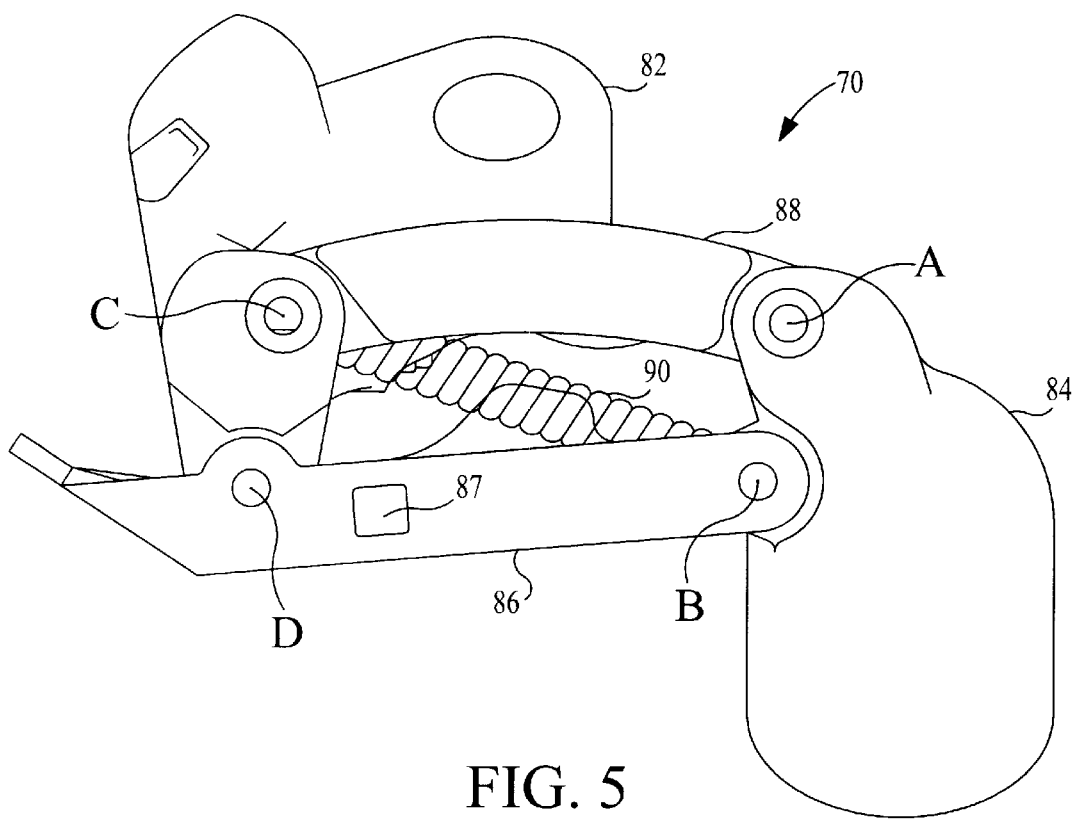
FIG. 5 is a side elevational view of the parallelogram link assembly of FIG. 3.
Figure 6:
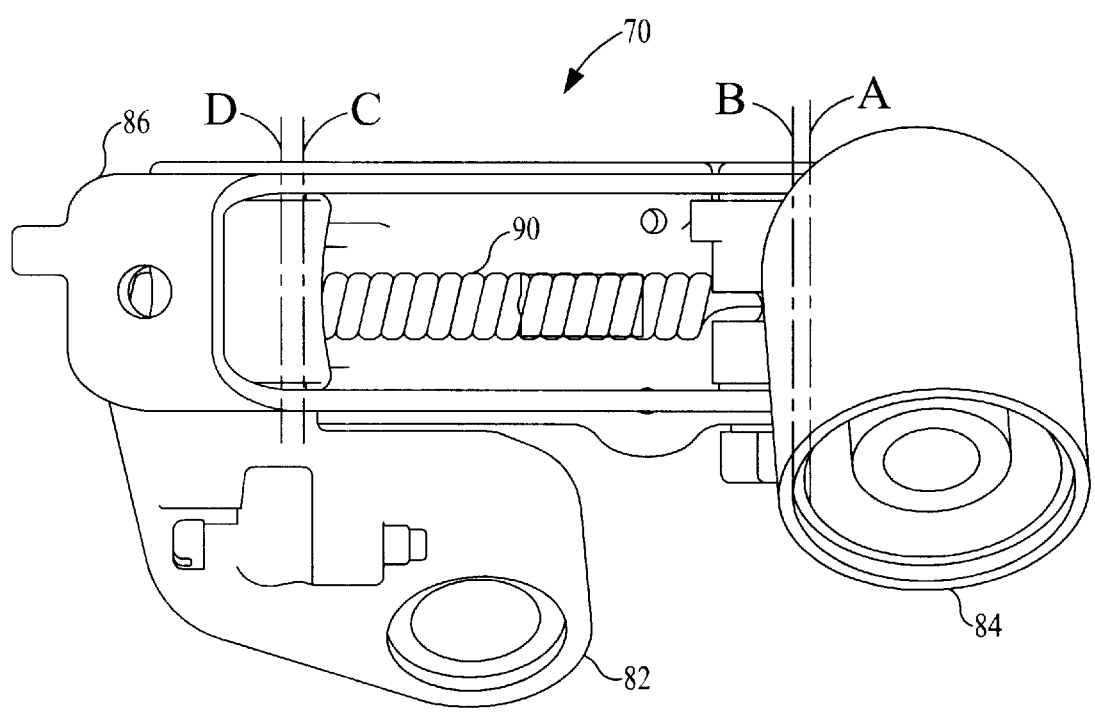
FIG. 6 is a bottom elevational view of the parallelogram link assembly of FIG. 3.
Figure 14:
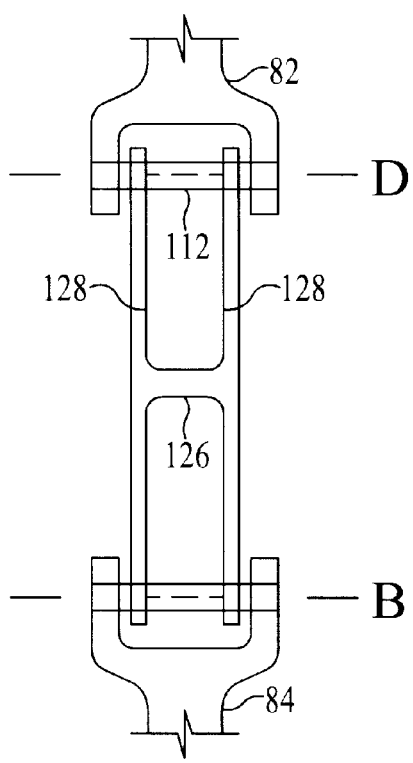

FIG. 14 is an additional embodiment of the invention wherein the base element 55 of a conventional side plate 40 (FIG. 2) is partially cut away leaving a base strip element 126 connecting flange or leg elements 128, the resulting side plate pivotally attached to pins 112. Each of the embodiments illustrated in FIGS. 7–14 employ two elongated legs or flange elements that together provide good axial stiffness in an X direction, but which are joined together with minimal structure in a Y direction (the same direction as that shown for shear forces, S, S' in FIG. 7). This minimal connecting element is relatively more yieldable to torsional forces acting around the X axis and to shear forces operating in the XY plane.

Figure 15:
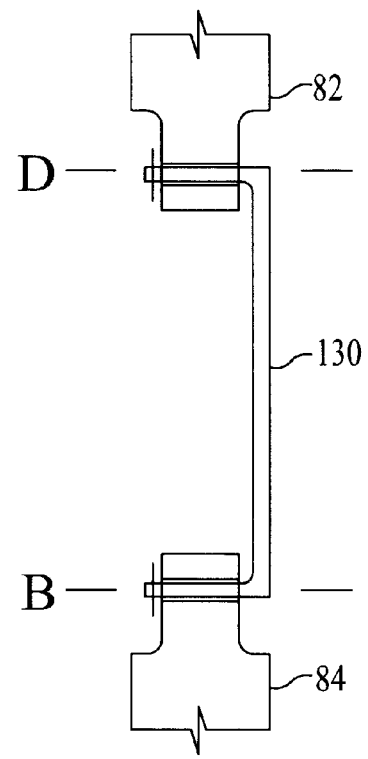

FIG. 15 is another embodiment of the invention where asymmetric side plate element 130, shaped like a sway bar, is pivotally attached to b-knuckle 82 and p-knuckle 84.

Figure 16:
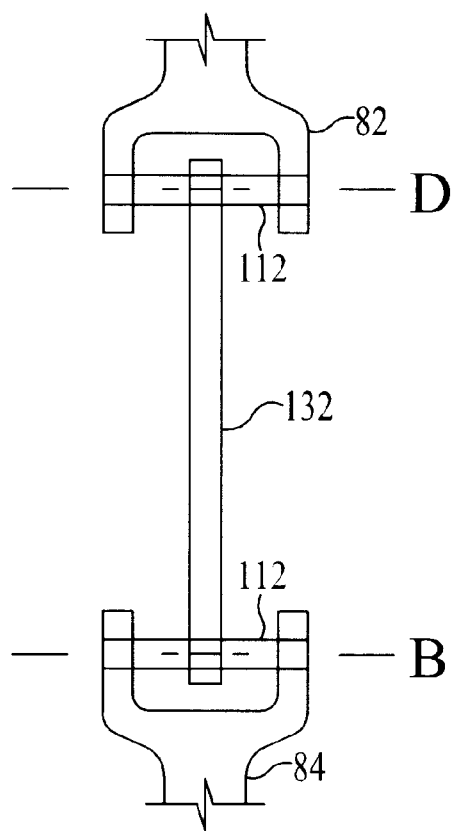

FIG. 16 is yet another embodiment of the invention where side plate 132 includes a simple flat metal strip hingedly connected to mounting pins 112.

Figure 17:
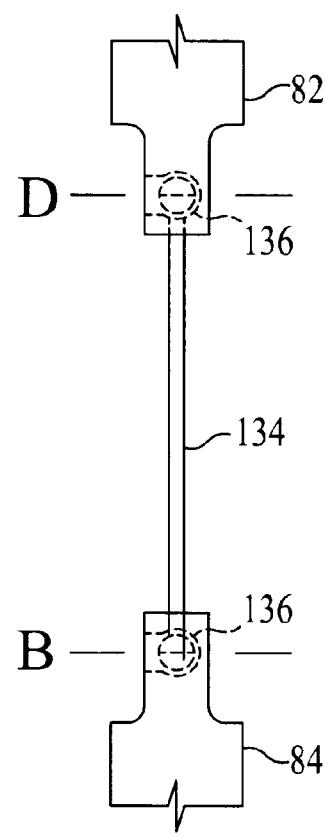

FIG. 17 is another embodiment of the invention wherein side plate comprises a "dog-bone" plate element rotatably coupled to b-knuckle 82 and p-knuckle 84 with ball and socket joints 136. In each of the single-leg embodiments shown in FIGS. 15–17, the illustrated link will exhibit good axial rigidity, but will be relatively more yieldable to torsion and shear forces.

Although numerous embodiments of the present invention have been described, they are merely exemplary of the invention and are not to be construed as limiting, the invention being defined solely by the scope of the spirit of the appended claims.

We claim:

1. A bicycle derailleur parallelogram side plate including:
   a first end of said side plate being rotatable about a first pivot axis;
   a second end of said side plate being rotatable about a second pivot axis substantially parallel to the first pivot axis; and
   said side plate exhibiting a rigidity along a third axis substantially perpendicular to and coplanar with the first and second pivot axes and, with respect to said rigidity along the third axis, said side plate exhibiting a relatively small resistance to torsional forces acting about the third axis, and exhibiting a relatively small resistance to shear forces parallel to the first and second pivot axes.

2. A bicycle derailleur parallelogram side plate according to claim 1, wherein said side plate is sufficiently rigid axially along the third axis to maintain a substantially constant spacing between the first and second axes.

3. A bicycle derailleur parallelogram side plate according to claim 1, wherein said side plate is formed from a single strip of sheet metal.

4. A bicycle derailleur parallelogram side plate according to claim 1, wherein said side plate includes a pair of elongated leg members connected by a link member, the first and second pivot axes passing through holes in the leg members.

5. A bicycle derailleur parallelogram side plate according to claim 1, wherein said side plate is an inboard one of two opposed side plates of the parallelogram.

6. A bicycle derailleur comprising:
   a b-knuckle attached to a bicycle frame;
   a p-knuckle operatively connected to said b-knuckle;
   first and second side plate s hingedly connected to said b-knuckle and p-knuckle, said first side plate hinged to said b-knuckle about a first pivot axis and hinged to said p-knuckle about a second pivot axis;
   said first side plate exhibiting a rigidity along a longitudinal axis substantially perpendicular to and coplanar with said first and second pivot axes and, relative to said axial rigidity along said longitudinal axis, exhibiting a relatively low resistance to torsion about the longitudinal axis and exhibiting a relatively low resistance to shear in a direction parallel to the pivot axes.

7. A bicycle derailleur parallelogram linkage comprising:
   a b-knuckle attached to a bicycle frame;
   a p-knuckle operatively connected to said b-knuckle;
   a first side plate hingedly connected to said b-knuckle about a first pivot axis and to a p-knuckle about a second pivot axis, the side plate defining a first longitudinal axis substantially perpendicular to and coplanar with the first and second pivot axes;
   a second side plate hingedly connected to said b-knuckle and p-knuckle and defining a second longitudinal axis substantially perpendicular to said second side plate's hinged connections to said b-knuckle and p-knuckle;
   said first side plate exhibiting an axial stiffness along the first longitudinal axis and a resistance to torsion about the first longitudinal axis which is substantially less than said first side plate's axial stiffness along the first longitudinal axis; and
   said first side plate exhibiting a resistance to shear forces parallel to the first and second pivot axes which is substantially less than said first side plate's axial stiffness along the first longitudinal axis.

8. A bicycle derailleur parallelogram linkage comprising:
   a b-knuckle attached to a bicycle frame;
   a p-knuckle operatively connected to said b-knuckle;
   a first side plate hingedly connected to said b-knuckle about a first pivot axis and p-knuckle about a second pivot axis and defining a first longitudinal axis substantially perpendicular to and coplanar with the first and second pivot axes;
   a second side plate hingedly connected to said b-knuckle about a third pivot axis and said p-knuckle about a fourth pivot axis, the second side plate defining a second longitudinal axis substantially perpendicular to and coplanar with the third and fourth pivot axes;
   said first side plate exhibiting a resistance to torsion about the first longitudinal axis which is substantially less than said second side plate's resistance to torsion about the second longitudinal axis; and
   said first side plate exhibiting a resistance to shear in a direction parallel to the first and second pivot axes which is substantially less than said second side plate's resistance to shear in a direction parallel to the third and fourth pivot axes.

9. A bicycle derailleur parallelogram linkage according to claim 8, wherein said side plate is sufficiently rigid axially along the first longitudinal axis to maintain a substantially constant spacing between the first and second pivot axes.

10. A bicycle derailleur parallelogram linkage according to claim 8, wherein said first side plate is formed from a single strip of sheet metal.

11. A bicycle derailleur parallelogram linkage according to claim 8, wherein said first side plate is located inboard of said second side plate.

12. A bicycle derailleur, comprising:
   a b-knuckle for attachment to a bicycle frame and defining therein at least a first axis substantially aligned with a Y direction and substantially disposed in an XY plane;
   a p-knuckle to which is operatively connected an idler cage, the p-knuckle movable relative to the b-knuckle during actuation of the derailleur, the p-knuckle having defined therein at least a second axis which is substantially aligned with the Y direction and substantially disposed in the XY plane; and
   a side plate rotatably connected to the b-knuckle about the first axis and rotatably connected to the p-knuckle about the second axis, the side plate comprising first and second legs each rotatably connected to the b-knuckle about the first axis and to the p-knuckle about the second axis and a connecting element connecting the first and second legs, each of the first and second legs having a length parallel to an X direction, a width parallel to a Z direction orthogonal to the X and Y directions and a depth parallel to the Y direction, the width of each of the legs being greater than the depth of the legs, the X dimension of an XZ cross section of the connecting element disposed between the first and second legs being small relative to the width of either of the legs, such that the side plate will exhibit axial rigidity along the X direction but will exhibit a resistance to torsional forces acting around a third axis perpendicular to the first and second axes which is smaller than said axial rigidity, and will exhibit a resistance to shear forces acting in the Y direction which is smaller than said axial rigidity.

13. The bicycle derailleur of claim 12, wherein each of the first and second legs has an end disposed adjacent a predetermined one of the first and second axes, the connecting element connecting the first and second legs only at said ends of the first and second sides.

14. A bicycle derailleur, comprising:

a b-knuckle for attachment to a bicycle frame and defining therein at least a first axis substantially aligned with a Y direction and substantially disposed in an XY plane;

a p-knuckle to which is operatively connected an idler cage, the p-knuckle movable relative to the b-knuckle during actuation of the derailleur, the p-knuckle having defined therein at least a second axis which is substantially aligned with the Y direction and substantially disposed in the XY plane; and at least a first side plate rotatably connected to the b-knuckle about the first axis and rotatably connected to the p-knuckle about the second axis, the side plate having first and second legs each having a length in an X direction orthogonal to the Y direction between the first and second axes, a width parallel to a Z direction orthogonal to the X and Y directions, and a depth parallel to the Y direction, the length of each side being greater than the width thereof and the width of each side being greater than the depth thereof, the first and second sides being connected together in a Y direction only at a single location of connection, an XZ cross sectional area of the location of connection having a small dimension in the X direction relative to the length of each leg, such that the side plate will exhibit coaxial rigidity in the X direction but will exhibit a lower resistance, relative to said coaxial rigidity, to torsional forces acting around the X axis and will exhibit a low resistance, relative to said coaxial rigidity, to shear forces acting in the Y direction.

15. The bicycle derailleur of claim 14, wherein the first and second legs are integrally formed of a single piece of material, the first and second legs being elongated and each having opposed ends, one end of the first leg being joined to one end of the second leg.

* * * * *